US007016531B1

(12) United States Patent
Murching et al.

(10) Patent No.: US 7,016,531 B1
(45) Date of Patent: Mar. 21, 2006

(54) PROCESS TO EXTRACT REGIONS OF HOMOGENEOUS COLOR IN A DIGITAL PICTURE

(75) Inventors: Anil M. Murching, Beaverton, OR (US); Thumpudi Naveen, Redmond, WA (US); Ali Tabatabai, Beaverton, OR (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/496,068

(22) Filed: Feb. 1, 2000

Related U.S. Application Data

(60) Provisional application No. 60/118,192, filed on Feb. 1, 1999, now abandoned.

(51) Int. Cl.
*G06K 9/34* (2006.01)
(52) U.S. Cl. ..................................... 382/164; 382/173
(58) Field of Classification Search ................ 382/164, 382/165, 173
See application file for complete search history.

(56) References Cited

U.S. PATENT DOCUMENTS 5,577,131 A * 11/1996 Oddou ........................ 382/173
5,585,944 A * 12/1996 Rodriguez ................... 382/162

OTHER PUBLICATIONS

Shafarenko et al. "Automatic Watershed Segmentation of Ramdomly Textured Color Images." Image Processing, IEEE Transactions on, vol.: 6 Issue: 11, Nov. 1997, Page(s): 1530-1544.*
Wang. "Unsupervised Video Segmentation Based on Watersheds and Temporal Tracking." Circuits and Systems for Video Technology, IEEE Transactions on, vol.: 8 Issue: 5, Sep. 1998, Page(s): 539-546.*
Haris et al. "Hybrid Image Segmentation Using Watershed and Fast Region Merging." Image Processing, IEEE Transactions o vol.: 7 Issue: 12, Dec. 1998, Page(s): 1684-1699.*
Luo et al. "Incorporation of derivative priors in adaptive Bayesian color image segmentation". Image Processing, 1998. ICIP 98 Proceedings. 1998 International Conference on, Oct. 4-7, 1998, Page(s): 780-784 vol. 3.*
Chang et al. "An adaptive Bayesian approach for color image segmentation". Visual Communication and Image Processing, SPIE 2094, 1993, pp. 813-822.*
Hansen et al. "Relaxation methods for supervised image segmentation". Pattern Analysis and Machine Intelligence, IEEE Transactions on, vol.: 19 Issue: 9, Sep. 1997, Page(s): 949-962.*

(Continued)

*Primary Examiner*—Vikkram Bali
*Assistant Examiner*—Colin LaRose
(74) *Attorney, Agent, or Firm*—Joseph S. Tripoli; Ronald H. Kurdyla; Joel M. Fogelson

(57) ABSTRACT

A method of extracting regions of homogeneous color from a digital picture divides the digital picture into blocks and generates a feature vector for each block as a set of moments of the data for the block. The distance between the feature vector of each block and the feature vectors of the nearest neighboring blocks are determined using either a weighted Euclidean distance metric or a probability mass function-based distance metric. The maximum distance is the gradient value for the block, and the set of gradient values over all the blocks form a color gradient field. The gradient field is digitized and smoothed, and then segmented into regions of similar color characteristics using a watershed algorithm.

1 Claim, 3 Drawing Sheets

2 Overall Process

Overall process used in region extraction

OTHER PUBLICATIONS

Lee et al. "Detecting boundaries in a vector field". Signal Processing, IEEE Transactions on [see also Acoustics, Speech, and Signal Processing, IEEE Transactions on, vol.: 39 Issue: 5, May 1991, Page(s): 1181-1194.*

Corridoni et al. "Pyramidal retrieval by color perceptive regions." Proceedings of IEEE International Workshop on Content-Base Access of Image and Video Database, Jan. 3, 1998, pp. 2-11.*

* cited by examiner

2 Overall Process
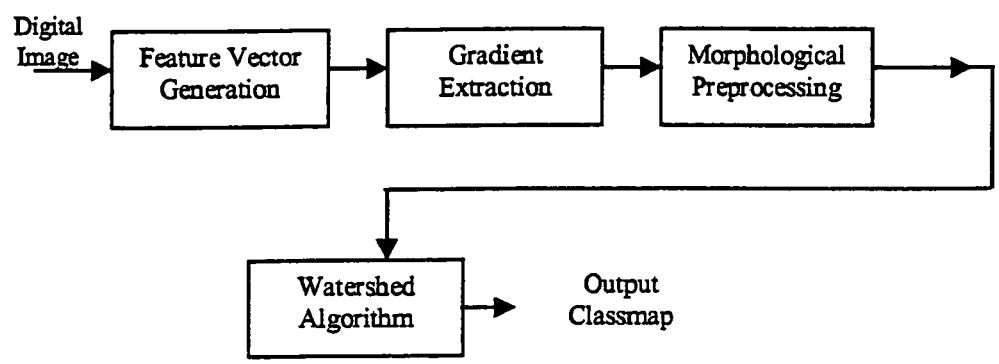
Figure 1 Overall process used in region extraction

Figure 2 Original image
Figure 3 Segmentation map obtained by merging 8x8 blocks, and using pmf-based distance metric (a total of N = 9 moments are computed for each block)

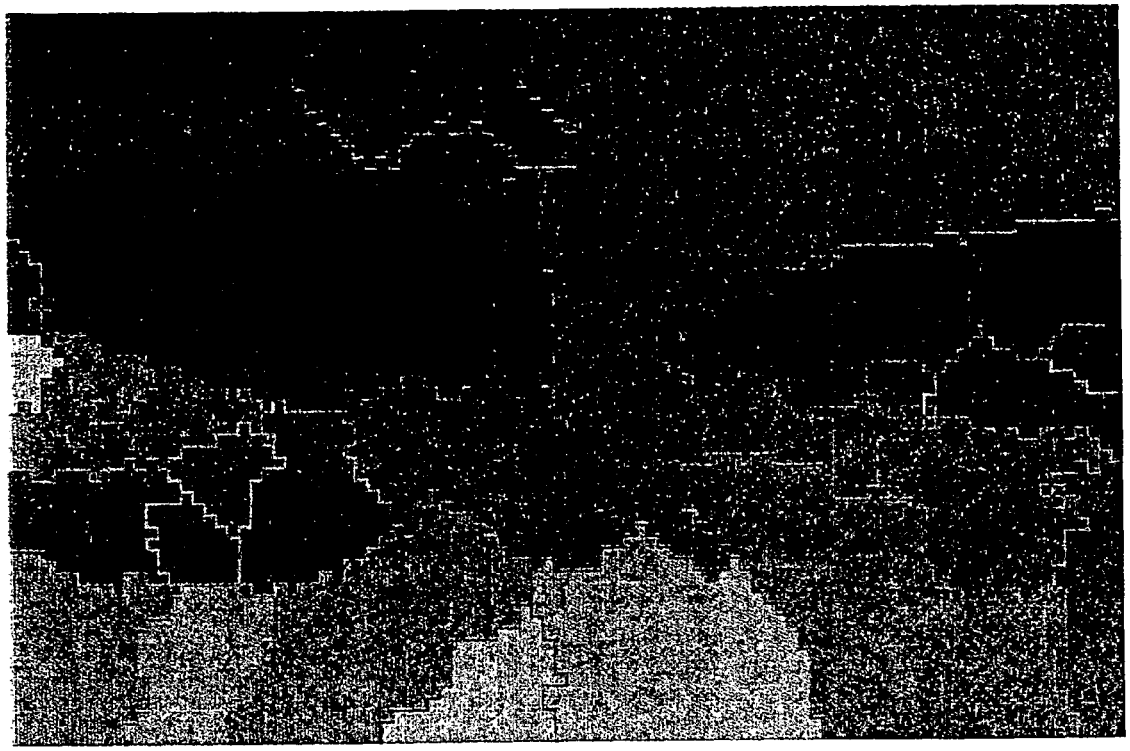
Figure 4 Segmentation map obtained by merging 8x8 blocks, using Euclidean distance metric (only 3 moments, namely the mean values, are computed in each block)

PROCESS TO EXTRACT REGIONS OF HOMOGENEOUS COLOR IN A DIGITAL PICTURE

CROSS REFERENCE TO RELATED APPLICATIONS

This is a continuation of provisional U.S. Patent Application Ser. No. 60/118,192 filed Feb. 1, 1999, now abandoned.

BACKGROUND OF THE INVENTION

The present invention relates to video data processing, and more particularly to a process for extracting regions of homogeneous color in a digital picture.

Extraction of semantically meaningful visual objects from still images and video has enormous applications in video editing, processing, and compression (as in MPEG-4) as well as in search (as in MPEG-7) applications. Extraction of a semantically meaningful object such as a building, a person, a car etc. may be decomposed into extraction of homogeneous regions of the semantic object and performing a "union" of these portions at a later stage. The homogeneity may be in color, texture, or motion. As an example, extraction of a car is considered as extraction of tires, windows and other glass portions, and the body of the car itself.

What is desired is a process that may be used to extract a homogenous color portion of an object.

BRIEF SUMMARY OF THE INVENTION

Accordingly the present invention provides a process for extracting regions of homogeneous color in a digital picture based on a color gradient field with two methods for computing the gradient field—a weighted Euclidean distance between moment-based feature vectors and a so-called pmf-based distance metric. The digital picture is divided into blocks, and a feature vector is generated for each block as the set of moments for the data in the block. The maximum distance between each block and its nearest neighbors is determined, using either the weighted Euclidean distance metric or the probability mass function-based distance metric, to generate a gradient value for each block. The set of gradient values define the color gradient field. The gradient field is digitized and smoothed, and then segmented into regions of similar color characteristics using a watershed algorithm.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is a block diagram view of an overall process according to the present invention.

FIG. 2 is an illustrative view of an original image.

FIG. 3 is an illustrative view of a segmentation map of the image of FIG. 2 according to a first embodiment of the present invention.

FIG. 4 is an illustrative view of a segmentation map of the image of FIG. 2 according to a second embodiment of the present invention.

DETAILED DESCRIPTION OF THE INVENTION

The process described here is block-based, i.e. the digital picture is first divided into many non-overlapping rectangular blocks (in general blocks of other shapes and of different sizes, and use of overlapping blocks may be used), and then spatially adjacent blocks that have similar color properties are merged together. This results in the classification of the picture into several spatially contiguous groups of blocks, each group being homogenous in color.

First, segment a digital picture based on a color gradient field, and then use one of two methods for computing that gradient field. The first method makes use of the weighted Euclidean distance between moment-based feature vectors. The second method makes use of the so-called pmf-based distance metric. The overall process is shown in FIG. 1.

The digital input images are assumed to be in YUV format. If the inputs are in a chrominance sub-sampled format such as 4:2:0, 4:1:1 or 4:2:2, the chrominance data is upsampled to generate 4:4:4 material.

Extract one feature vector for each P×Q block of the input picture. There are two stages in the feature vector generation process. In the first stage, transform the data from the original YUV color co-ordinate system into another co-ordinate system known as CIE—L*a*b* [see *Fundamentals of Digital Image Processing*, by Anil K. Jain, Prentice-Hall, Section 3.9]. The latter is known to be a perceptually uniform color system, i.e. the Euclidean distance between two points (or colors) in the CIE—L*a*b* co-ordinate system corresponds to the perceptual difference between the colors.

The next stage in the feature vector generation process is the calculation of the first N moments of the CIE—L*a*b* data in each block. Thus, each feature vector has 3N components (N moments in L, N moments in a, and N moments in b). (See the Appendix).

The next stage in the region extraction process is that of gradient extraction. Estimate a block-based gradient field for the input picture (i.e. get one scalar gradient value for each P×Q block of the input picture). The gradient at the (i, j)-th block of the input picture is defined as the maximum of the distances between the block's feature vector f(i,j) and its nearest neighbor's feature vectors. (See Appendix) (In the maximization, let k and l each vary from −1 to +1, but do not allow k=l=0 simultaneously! Also, along the borders of the image, consider only those neighboring blocks that lie inside the image boundaries). Use one of two types of distance functions.

Other methods to select the gradient value from the above set of distances, for example the minimum, median, etc. May be used. It is necessary to evaluate the performance of the segmentation algorithm when such methods are used.

The distance function is simply the weighted Euclidean distance between two vectors. (See Appendix). In the formula, the weighting factors may be used to account for the differences in scale among the various moments. This metric is very easy to implement. In one implementation, set N=1, i.e. use only the mean values within each P×Q block, and set the weighting factors to unity (this makes sense, since the CIE—L*a*b* space is perceptually uniform).

The second choice of the distance metric is a little more involved. Here, the fact is exploited that using the moments of the data within the P×Q block, an approximation to the probability mass function (pmf) of that data may be computed. The pmf essentially describes the distribution of the data to be composed of a mixture of several values, with respective probabilities. The values and the probabilities together constitute the pmf. Compute these values using the moments as described in the Appendix.

Thus, the moment-based feature vector of each P×Q block may be converted into a pmf-based representation. With such a representation, then the distance between two feature vectors may be computed via the distance between the two pmf's. For this, make use of the Kolmogorov-Smirnoff (K-S) test, as described in Section 14.3 of "*Numerical Recipes in C*", $2^{nd}$ edition, by W. A. Press, S. A. Teukolsky, W. T. Vetterling, and B. P. Flannery, Cambridge University Press. (Essentially, the distance between two pmf's is the area under the absolute value of the difference between the two cumulative distribution functions, see the above-mentioned chapter for details).

Though the K-S test is prescribed for pmf's of a single variable, the data is in fact three-dimensional (L, a, and b components). Strictly speaking, it is necessary to compute the joint, three-dimensional pmf, and then compute a distance between two pmf's. This is however a very hard problem to solve, and instead a simplifying assumption is made. Assume that the color data in a P×Q block may be modeled by means of three independent pmf's, one each for the L, a, and b components. (See Appendix).

The gradient field, as computed above, yields values that lie along the positive real axis (i.e. can vary from zero to infinity). In practice, the gradient values occupy a finite range, say from minimum to maximum. Digitize the gradient field at a precision of B bits, by dividing the above range into $2^B$ levels. In one implementation, choose B=8.

After the gradient field has been digitized, perform morphological preprocessing. This process removes small bumps in the gradient field, and helps the subsequent watershed algorithm to perform a better segmentation. The preprocessing algorithm used has been taken from "*Unsupervised Video Segmentation Based on Watersheds and Temporal Tracking*", by Demin Wang, pages 539 through 546, IEEE Transactions on Circuits and Systems for Video Technology, Volume 8, Number 5, September 1998. "Reconstruction By Erosion" is used as described in "*Morphological Grayscale Reconstruction in Image Analysis: Applications and Efficient Algorithms*", by Luc Vincent, pages 176 through 201, IEEE Transactions on Image Processing, Volume 2, Issue 2, April 1993. In this process, a smoothing threshold that is 0.7% of the dynamic range of the gradient field is used.

The digitized gradient field, after the above preprocessing, is segmented by what is known as the watershed algorithm. The algorithm description is in the above-mentioned journal article by Luc Vincent. The watershed algorithm divides the gradient field into a set of spatially connected regions, each of which is "smooth" in its interior. Thus, these regions are characterized by having strong gradients at their boundaries. Since the gradient value is proportional to the perceptual difference in color, by the above way of calculating the distance metric, the image is segmented into regions of homogenous color.

Once the input digital image has been segmented into regions that are homogenous in color and are spatially connected, this information may be used in database/search applications. Each region may be represented by one feature vector, consisting of either the same N moments that were used in the segmentation process, or consisting of the pmf-based representation that are computed from those moments. The latter representation is more powerful, because capturing the probability distribution of the data is known to be very useful for indexing visual objects for search applications. In this case the work by Szego ("Orthogonal Polynomials", $4^{th}$ edition, American Math. Society, Providence, Volume 23, 1975) is used to compute the pmf-based representation from the moments. Then, create an entry for this image in the database, consisting of the classification map together with the characteristic feature vector for each class (region). The use of such an index for database applications is described in a co-pending provisional U.S. Patent Application Ser. No. 60/118,192.

Although in the described implementation non-overlapping rectangular blocks are used, this process may be generalized to blocks of other shapes (square, hexagonal, etc.). Also overlapping blocks may be used, which helps in obtaining a segmentation map that is of higher resolution (than the current block-based segmentation map).

One particular computation of local activity measures has been described, where the moments are computed over rectangular (P×Q) blocks. Activity measures other than moments may be used. Also different block sizes for different areas of the image may be used.

The described pmf-based distance metric uses only two representative values and their probabilities. This metric may be extended by using more representative values (resulting in a more accurate representation of the true probability distribution of the data). A closed form solution for computing more representative values and their corresponding probabilities can be found in the work by Szego.

Other methods than the watershed algorithm may be used to merge blocks. K-means clustering, quadtree segmentation, etc. are possible alternatives.

Thus the present invention provides a process for extracting regions of homogeneous color in a digital picture by segmenting the picture based on a color gradient field, computing the gradient field by one of two distance metrics, digitizing and preprocessing the gradient field, and then segmenting the preprocessed digitized color gradient field with a watershed algorithm.

What is claimed is:

1. A method of extracting regions of homogenous color in a digital picture comprising the steps of:
    dividing the digital picture into blocks wherein each block comprises a plurality of pixels; and
    merging together spatially adjacent blocks that have similar color properties to extract the regions of homogenous color, wherein the merging step comprises the additional steps of:
    extracting a feature vector for each block;
    estimate a scalar gradient value for each block as a function of the feature vector, the set of gradient values defining a color gradient field;
    digitizing the color gradient field;
    preprocessing the digitized color gradient field to produce a smoothed color gradient field; and segmenting the smoothed color gradient field with a watershed algorithm that divides the smoothed color gradient field into a set of spatially connected regions of homogenous color; wherein
        wherein the estimating step comprises the steps of:
        obtaining distances between the feature vector of each block and the feature vectors of each neighboring block; and selecting the maximum of the distance as the gradient value for the block; and wherein the obtaining step comprises the steps of:

converting the feature vector of each block into a probability mass function-based representation for each color component;

computing distances between the probability mass function-based representations of each block and the corresponding probability mass function-based representations of each neighboring block; and selecting the maximum distance of the probability mass function based representations as the gradient value for the block.

* * * * *